United States Patent
Berman

(10) Patent No.: US 8,295,513 B2
(45) Date of Patent: Oct. 23, 2012

(54) AUDIO SYSTEM ADAPTERS FOR AUDIO SIGNAL DISTRIBUTION USING ELECTRICAL EXTENSION CABLES

(75) Inventor: Steven Berman, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/647,168

(22) Filed: Dec. 24, 2009

(65) Prior Publication Data

US 2011/0156477 A1    Jun. 30, 2011

(51) Int. Cl.
- H03F 99/00 (2009.01)
- H04B 3/00 (2006.01)
- H01R 13/648 (2006.01)
- H01R 12/00 (2006.01)

(52) U.S. Cl. ........ 381/120; 381/77; 381/94.1; 381/94.5; 439/386; 439/63

(58) Field of Classification Search ............. 381/77, 381/120, 94.1, 94.5; 439/386, 63, 620, 26
See application file for complete search history.

(56) References Cited

U.S. PATENT DOCUMENTS

| | | | |
|---|---|---|---|
| 4,369,412 A | 1/1983 | Sakano | |
| 4,379,209 A | 4/1983 | Sakano | |
| 4,853,821 A * | 8/1989 | Lewis | 361/92 |
| 4,900,270 A | 2/1990 | Edwards et al. | |
| 5,327,230 A | 7/1994 | Dockery | |
| 5,395,264 A | 3/1995 | Keith | |
| 5,573,424 A | 11/1996 | Poppe | |
| 5,792,986 A | 8/1998 | Lee | |
| 5,920,634 A | 7/1999 | Chiquette | |
| 5,971,799 A | 10/1999 | Swade | |
| 6,503,104 B1 | 1/2003 | Yuga et al. | |
| 6,611,537 B1 | 8/2003 | Edens et al. | |
| 6,722,902 B2 | 4/2004 | Kedzierski | |
| 2002/0118843 A1 | 8/2002 | Totani et al. | |
| 2007/0104338 A1 | 5/2007 | Privett | |
| 2009/0092236 A1 | 4/2009 | Wilson | |
| 2009/0104811 A1 | 4/2009 | Sumida | |

FOREIGN PATENT DOCUMENTS

| | | |
|---|---|---|
| JP | 10069822 | 3/1998 |
| WO | WO02063920 | 8/2002 |

OTHER PUBLICATIONS

Masayuki, Sato et al., "Japanese Patent Application Publication No. 10-069822 Abstract (English Translation)", Application No. 08-244073; Date of filing : Aug. 27, 1996 Mar. 10, 1998 , 1 pg.

* cited by examiner

Primary Examiner — Devona Faulk
(74) Attorney, Agent, or Firm — DeLizio Gilliam, PLLC

(57) ABSTRACT

Audio cables used in deploying audio equipment are typically selected to minimize signal transmission losses and may be chosen based on a distance between, and terminations of, an amplifier system and a loudspeaker system. Since this is usually unknown prior to deployment, multiple audio cables with different sizes and terminations and a variety of electrical extension cords to connect to a power supply line are transported. A loudspeaker adapter for the loudspeaker system and an amplifier adapter for the amplifier system can be used to interconnect the two systems via electrical extension cords. This precludes the need for transporting a large number of audio cables, and allows for interconnecting the loudspeaker and the amplifier systems without prior knowledge of the distance between the systems. Safety hazards and component damage can also be minimized by not connecting a hot terminal in the AC connectors of the loudspeaker and amplifier adapters.

20 Claims, 4 Drawing Sheets

US 8,295,513 B2

AUDIO SYSTEM ADAPTERS FOR AUDIO SIGNAL DISTRIBUTION USING ELECTRICAL EXTENSION CABLES

BACKGROUND

Embodiments of the inventive subject matter generally relate to the field of signal distribution and, more particularly, to audio system adapters for audio signal distribution using electrical extension cables.

Sound reinforcement systems comprising audio equipment, such as amplifiers and loudspeakers, are typically used at events to amplify audio for an audience. Deploying the sound reinforcement systems involves temporary installation of the audio equipment. This involves electrically connecting amplifiers to loudspeakers using audio cables, connecting the audio equipment to a power supply line, etc.

SUMMARY

Various embodiments for audio system adapters for audio signal distribution using electrical extension cables are presented. Embodiments include an audio device adapter comprising an audio connector configured to couple to a positive and a negative audio terminal on an audio device. The audio connector comprises a first terminal configured to couple to the positive audio terminal on the audio device and a second terminal configured to couple to the negative audio terminal on the audio device. The audio device adapter also comprises an AC connector coupled to the audio connector and comprising a ground terminal, a neutral terminal, and a hot terminal. The neutral terminal of the AC connector is coupled to the first terminal of the audio connector, and the ground terminal of the AC connector is coupled to the second terminal of the audio connector.

Another embodiment includes a loudspeaker adapter comprising an audio connector configured to couple to a positive and a negative audio terminal on a loudspeaker system. The audio connector comprises a first terminal configured to couple to the positive audio terminal on the loudspeaker system and a second terminal configured to couple to the negative audio terminal on the loudspeaker. The loudspeaker adapter also comprises an AC connector coupled to the audio connector and comprising a ground terminal, a neutral terminal, and a hot terminal. The neutral terminal of the AC connector is coupled to the first terminal of the audio connector, the ground terminal of the AC connector is coupled to the second terminal of the audio connector, and the hot terminal of the AC connector is not connected to the audio connector.

Another embodiment includes an amplifier adapter comprising an audio connector configured to couple to a positive and a negative audio terminal on an amplifier system. The audio connector comprises a first terminal configured to couple to the positive audio terminal on the amplifier system and a second terminal configured to couple to the negative audio terminal on the amplifier system. The amplifier adapter also comprises an AC connector coupled to the audio connector and comprising a ground terminal, a neutral terminal, and a hot terminal. The neutral terminal of the AC connector is coupled to the first terminal of the audio connector, the ground terminal of the AC connector is coupled to the second terminal of the audio connector, and the hot terminal of the AC connector is not connected to the audio connector.

Another embodiment includes an amplifier adapter comprising an amplifier audio connector configured to couple to a positive and a negative amplifier audio terminal on an amplifier system. The amplifier audio connector comprises a first terminal configured to couple to the positive amplifier audio terminal on the amplifier system and a second terminal configured to couple to the negative amplifier audio terminal on the amplifier system. The amplifier adapter also includes a duplex AC connector comprising a first AC connector and a second AC connector. The first AC connector and the second AC connector are coupled to the amplifier audio connector and each of the first AC connector and the second AC connector comprise a ground terminal, a neutral terminal, and a hot terminal. The neutral terminal of the first AC connector and the neutral terminal of the second AC connector are coupled to the first terminal of the amplifier audio connector. The ground terminal of the first AC connector and the ground terminal of the second AC connector are coupled to the second terminal of the amplifier audio connector. The hot terminal of the first AC connector and the hot terminal of the second AC connector are not connected to the amplifier audio connector.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1A:
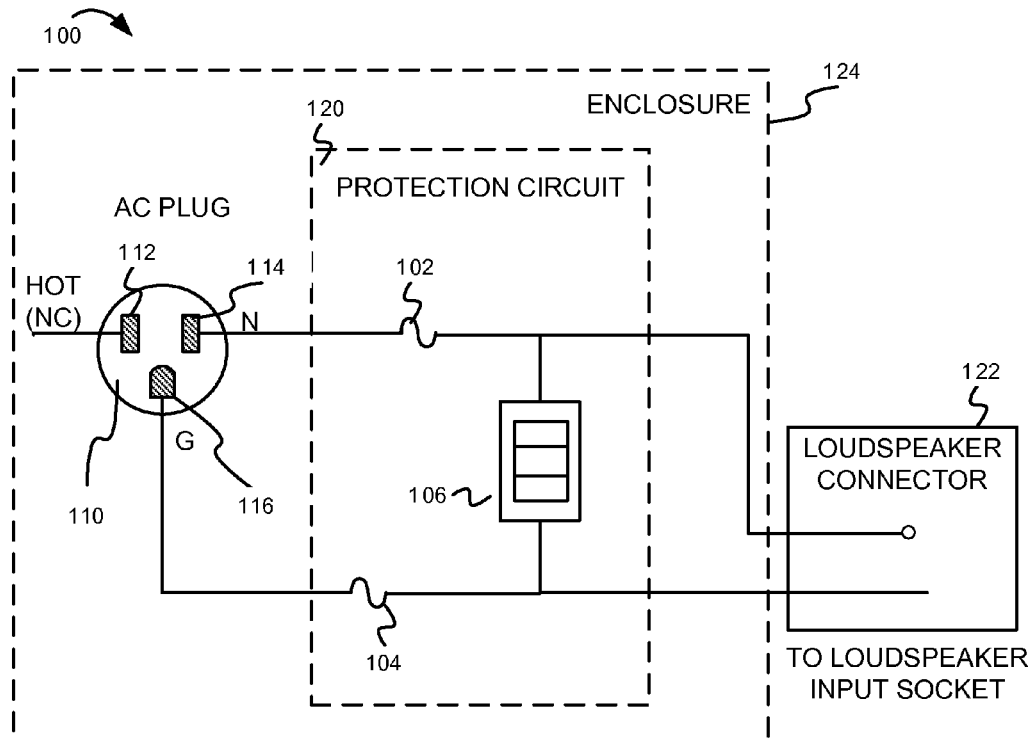
FIG. 1A is a circuit diagram illustrating an example loudspeaker adapter.

The description that follows includes exemplary circuits, systems, and methods that embody techniques of the present inventive subject matter. However, it is understood that the described embodiments may be practiced without these specific details. For instance, although examples refer to techniques for using audio adapters comprising NEMA 5-15 plugs and receptacles to connect audio equipment, in other embodiments, other types of AC plugs and their corresponding receptacles (e.g., NEMA 5-X connectors, NEMA 6-X, NEMA 14-X, NEMA L-X locking connectors, etc.) can be used to interconnect the audio equipment. In other instances, well-known structures and techniques have not been shown in detail in order not to obfuscate the description.

Deploying mobile audio reinforcement equipment typically comprises connecting an audio amplifier system to a loudspeaker system using audio cables. The length of the audio cables is determined by the distance between the audio amplifier system and the loudspeaker system. Moreover, the audio cables are chosen (e.g., cable size, thickness, etc.) based on the distance between the audio amplifier system and the loudspeaker system. The audio cables are also chosen so that the audio cables can carry the audio output from the amplifier system to the loudspeaker system without resulting in significant losses due to the audio cable's resistance. For example, for longer audio cable runs, audio cables with a comparatively larger cable diameter may be utilized to prevent excessive power losses. Before the mobile audio reinforcement equipment is deployed, how much audio cable will be required to connect the amplifier system and the loudspeaker system is typically not known. Furthermore, the audio cables are terminated in amplifier or loudspeaker connectors, that are not field-changeable and that are specific to the type of audio equipment being used. Deploying the mobile audio reinforcement equipment, therefore, typically results in the need for transporting multiple audio cables—each with different lengths and thicknesses and with appropriate matching terminations based on the audio equipment to be used.

In addition to connecting the audio amplifier system and the loudspeaker system, the mobile audio reinforcement equipment is also connected, typically using electrical extension cords, to power outlets. In some embodiments, industry-standard electrical extension cords can be used in conjunction with a loudspeaker adapter unit at the loudspeaker system and an amplifier adapter unit at the amplifier system to interconnect the amplifier system and the loudspeaker system. The loudspeaker adapter comprises, on one end, a connector that connects to the loudspeaker system and comprises, on the other end, an AC connector. Likewise, the amplifier adapter comprises, on one end, a connector that connects to the amplifier system and comprises, on the other end, an AC connector matched to the AC connector of the loudspeaker adapter. Additionally, the loudspeaker adapter and the amplifier adapter are constructed such that a hot terminal (also called a live terminal) in their respective AC connectors is not connected. This helps prevent injury to operators of the mobile sound reinforcement system, and helps prevent damage to components of the mobile sound reinforcement system, in case the AC connectors are inadvertently connected to a power supply line.

Fitting the loudspeaker adapter and the amplifier adapter to the loudspeaker system and the amplifier system, respectively, and using inexpensive, commonly available electrical extension cords to interconnect the loudspeaker system and the amplifier system precludes the need for maintaining and transporting a large number of specialty audio cables of various lengths, wire gauges, and terminations. This also allows for interconnecting the loudspeaker system and the amplifier system without prior knowledge of the distance between the loudspeaker and the amplifier systems. Furthermore, a common amplifier system can drive multiple loudspeaker systems by using common electrical outlet multiple-tap units, thus eliminating the need for daisy-chaining techniques that typically increase the cable loss load on the amplifier system and reduce output power available to the loudspeaker systems.

FIG. 1A is a circuit diagram illustrating one example of a loudspeaker adapter 100. As illustrated, the loudspeaker adapter 100 comprises an AC plug 110, a protection circuit 120, and a loudspeaker connector 122. The AC plug 110 comprises three terminals—a hot terminal 112, a neutral terminal 114, and a ground terminal 116. In one embodiment, the AC plug 110 may be the male AC connector used in electrical extension cords. For example, the AC plug 110 can be a NEMA 5-15 male plug. In NEMA 5-15 male plugs, the hot terminal 112 connects to a hot contact in a corresponding receptacle and, if plugged into the power line socket, carries current from a source (e.g., the power supply line) to a load electrical device (e.g., an electrical device plugged into the power line socket). However, as illustrated, in the AC plug 110, the hot terminal 112 is not connected to prevent hazards due to unintentional human exposure to power supply line voltage and to prevent component damage, as will be further described below. In NEMA 5-15 male plugs, the neutral terminal 114 connects to a neutral contact in the corresponding receptacle and completes the circuit comprising the hot terminal and the electrical device to return current to the source. In the AC plug 110, however, the neutral terminal 114 facilitates transfer of audio output power from an amplifier system to a loudspeaker system. In NEMA 5-15 male plugs, the ground terminal 116 connects to a ground contact in the corresponding receptacle and connects to ground (i.e., earth) to protect against electrical malfunction (e.g., insulation failure) of the connected electrical device. In the AC plug 110, however, the ground terminal 116 facilitates transfer of audio output power from the amplifier system to the loudspeaker system. In some embodiments, the loudspeaker adapter 100 may comprise an enclosure 124 (depicted by dashed lined around the loudspeaker adapter 100). The loudspeaker adapter 100 may be encapsulated in an approved metal or plastic enclosure 124. The enclosure 124 may house the wires, the protection circuit 120, etc. and may leave the AC plug 110 and the loudspeaker connector 122 accessible. It is also noted, that in other embodiments, the AC plug 110 can be other types of AC plugs, e.g., a recessed NEMA 5-15 male plug, a NEMA 5-20 plug, or other suitable three-wire AC connector.

Figure 1B:
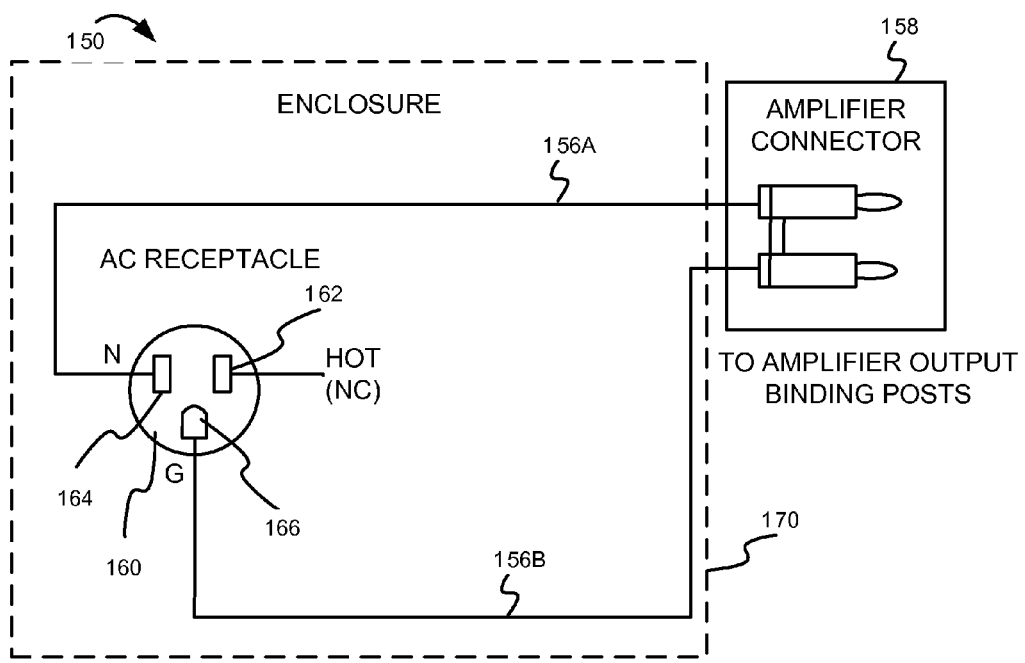
FIG. 1B is a circuit diagram illustrating an example amplifier adapter.

As shown in FIG. 1, the hot terminal 112 of the AC plug 110 is not connected to the protection circuit 120 or to the loudspeaker connector 122 to prevent hazards due to unintentional human exposure to power supply line voltage (e.g., 120V of a power supply line). In contrast, if the hot terminal 112 was utilized in the loudspeaker connector 122, and the AC plug 110 is inadvertently plugged into a power supply line receptacle, current would flow through the power supply line receptacle, through the hot terminal 112, and to the loudspeaker system. This can cause the high voltage (e.g., 120V) of the power supply line to be applied to delicate circuitry of the loudspeaker system, thus damaging components of the loudspeaker system. Moreover, the high voltage of the power supply line may also cause harm to operators who inadvertently touch such a "live" wire/electrical component(s). Thus, not connecting the hot terminal 112 and using only the neutral terminal 114 and the ground terminal 116 to complete a circuit between the loudspeaker adapter 100 and an amplifier adapter (described with reference to FIG. 1B) ensures that only audio output power flows from the amplifier system to the loudspeaker system without the risk of conducting a power line voltage, should the adapter be misused.

Additionally, the AC plug 110 is coupled to a protection circuit 120. The protection circuit 120 is configured to protect a loudspeaker system (not shown) from damage and to protect users from shock hazards that may result if the neutral terminal 114 or the ground terminal 116 of the loudspeaker adapter 100 is inadvertently connected to a high voltage power source. As illustrated, in one embodiment, the protection circuit 120 comprises two fuses 102 and 104 and an overvoltage device 106. In one embodiment, the overvoltage device 106 can comprise a metal oxide varistor (MOV). It is noted, however, that in some implementations, the protection circuit 120 may also comprise other components for protecting the loudspeaker system. In the example shown in FIG. 1, the neutral terminal 114 of the AC plug 110 is connected to one terminal of the fuse 102. The other terminal of the fuse 102 is connected to one terminal of the overvoltage device 106 and to a loudspeaker connector 122 for loudspeaker connection. The loudspeaker connector 122 can be a ¼ inch phone plug, a Speakon® connector, banana plugs, or other suitable connector that is matched to an input connector on the loudspeaker system. The ground terminal 116 of the AC plug 110 is connected to one terminal of the fuse 104. The second terminal of the fuse 104 is connected to a second terminal of the overvoltage device 106 and to the loudspeaker connector 122. In one implementation, the various components of the loudspeaker adapter 100 (e.g., the AC plug 110, the protection circuit 120, the loudspeaker connector 122, etc.) may be connected using 14 gauge American wire gauge (AWG) stranded, insulated conductors. In another implementation, the various components of the loudspeaker adapter 100 may be connected using other suitable insulated conductors.

The fuses 102 and 104 and the overvoltage device 106 can protect the loudspeaker system from high voltage in case of both operator misuse, and faulty wiring in a power supply line receptacle. For example, faulty wiring in the power supply receptacle (e.g., connecting the hot wire of the power supply line to the neutral terminal of the receptacle) and improperly inserting the AC plug 110 into such a power supply receptacle (e.g., connecting the neutral terminal 114 to a hot wire of the power supply line receptacle) can cause the high voltage current to flow through the loudspeaker adapter 100. The fuses 102 and 104 and the overvoltage device 106 protect against faulty wiring or improper insertion of the AC plug 110 into a power supply line receptacle. It should be noted that the protection circuit 120 may also protect the loudspeaker adapter 100 from damage if the loudspeaker adapter 100 is inadvertently connected to other high voltage sources.

FIG. 1B is an example circuit diagram illustrating an amplifier adapter 150. As illustrated, the amplifier adapter 150 comprises an AC receptacle 160 and an amplifier connector 158. The AC receptacle 160 comprises three terminals—a hot terminal 162, a neutral terminal 164, and a ground terminal 166. In one embodiment, the AC receptacle 160 may be the female AC connector used in electrical extension cords. For example, the AC receptacle 160 can be a NEMA 5-15 female connector. In NEMA 5-15 female receptacles, if associated with a power supply line, the hot terminal 162 connects to a hot terminal of a corresponding plug and carries current from a source (e.g., the power supply line) to a load electrical device. However, as illustrated, in the AC receptacle 160, the hot terminal 162 is not connected. In NEMA 5-15 female receptacles, the neutral terminal 164 connects to a neutral terminal in the corresponding plug and completes the circuit comprising the hot terminal and the electrical device to return current to the source. In the AC receptacle 160, however, the neutral terminal 164 in conjunction with the ground terminal 166 facilitate transfer of audio output power from an amplifier system to a loudspeaker system. In some embodiments, the amplifier adapter 150 may comprise an enclosure 170 (depicted by dashed lined around the amplifier adapter 150). The amplifier adapter 150 may be encapsulated in an approved metal or plastic enclosure 170. The enclosure 170 may house the wires and other circuitry (e.g., a protection circuit) leaving the AC receptacle 160 and the amplifier connectors 158 accessible. In another embodiment, the AC receptacle 160 can be other types of AC receptacles, e.g., a NEMA 5-20 receptacle or other suitable three-wire AC receptacle that is matched to the AC plug 110 of FIG. 1A.

The AC receptacle 160 is connected to the amplifier connector 158 such that the neutral terminal 164 of the AC receptacle 160 is connected, via a conductor 156A, to one terminal of an amplifier connector 158. The ground terminal 166 of the AC receptacle 160 is connected, via conductor 156B, to a second terminal of the amplifier connector 158. The amplifier connector 158 can be a pair of banana plugs (as depicted in FIG. 1B), a Speakon connector, a ¼ inch diameter phone plug or other appropriate connector that connects to output terminals of an amplifier system such as a binding post or ¼ inch phone socket, etc. In one implementation, the conductors 156A and 156B may be 14 gauge AWG stranded, insulated wires. In another implementation, the conductors 156A and 156B may be other suitable insulated conductors. As noted above, the hot terminal 162 of the AC receptacle 160 is not connected.

The amplifier connector 158 in the amplifier adapter 150 is connected to the amplifier system's output binding posts while the loudspeaker connector 122 in the loudspeaker adapter 100 is connected to the input terminals of the loudspeaker system. The loudspeaker system and the amplifier system can be connected to each other by connecting the AC plug 110 and the AC receptacle 160. One or more common electrical extension cords can be connected between the AC plug 110 of the loudspeaker adapter 100 and the AC receptacle 160 of the amplifier adapter 150 depending on the distance between the amplifier system and the loudspeaker system. For example, the AC plug 110 can be connected to an AC receptacle of the electrical extension cord, while an AC plug of the electrical extension cord can be connected to the AC receptacle of the amplifier adapter 150 (or an AC receptacle of another electrical extension cord as required). This is illustrated in FIG. 2.

Figure 2:
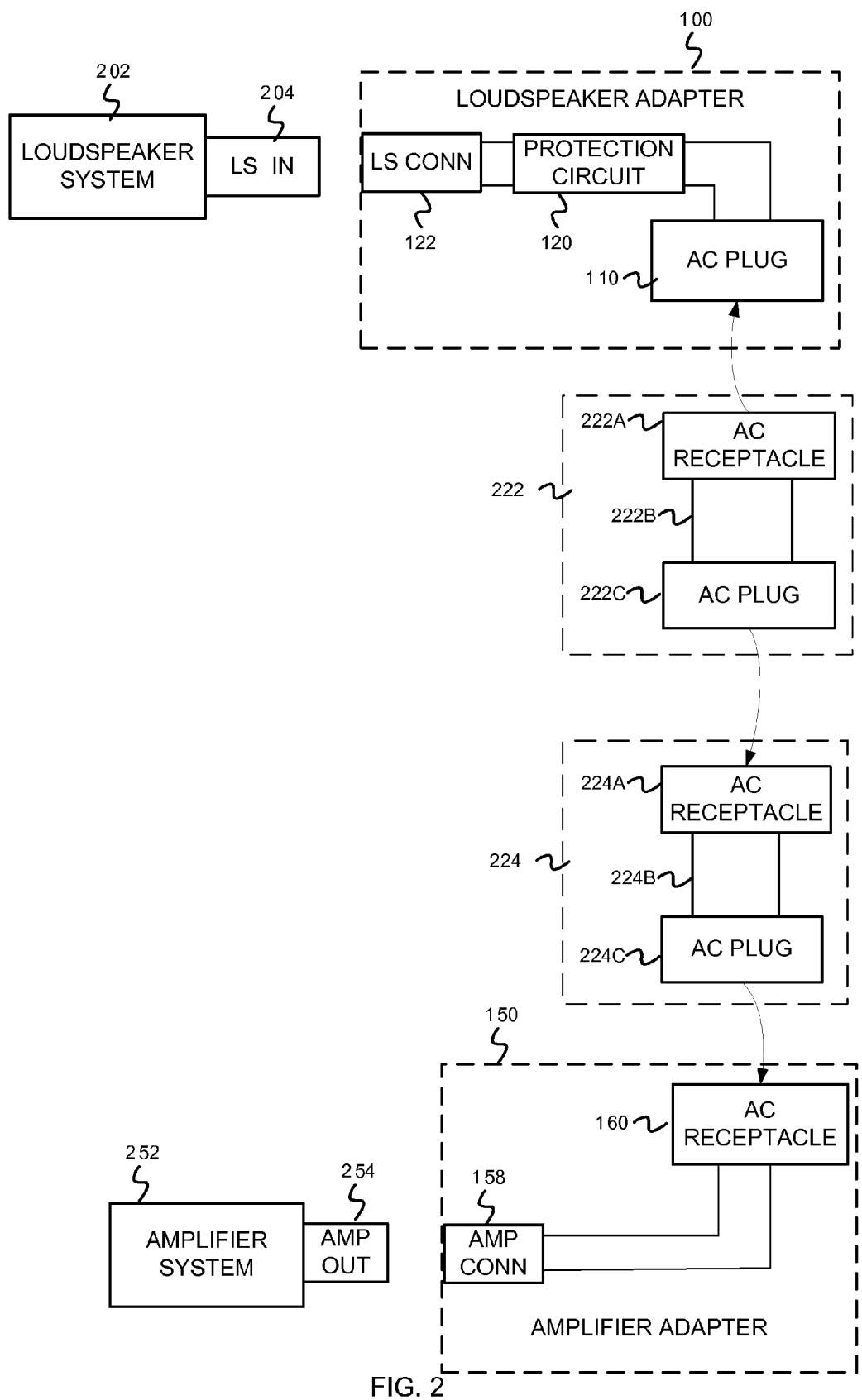
FIG. 2 is an example circuit diagram illustrating connection of a loudspeaker system and an amplifier system using extension cords.

FIG. 2 is an example circuit diagram illustrating connection of a loudspeaker system and an amplifier system using electrical extension cords. FIG. 2 depicts a loudspeaker system 202, the loudspeaker adapter 100, the amplifier adapter 150, an amplifier system 252, and electrical extension cords 222 and 224. The loudspeaker system 202 comprises a loudspeaker input connector 204. As described with reference to FIG. 1A, the loudspeaker adapter 100 comprises the loudspeaker connector 122 that is matched to the loudspeaker input connector 204. The loudspeaker connector 122 is coupled to the AC plug 110 via the protection circuit 120. The protection circuit 120 can be configured to protect the loudspeaker system 202 from damage and to protect users from shock hazards from overvoltage conditions. The amplifier system 252 comprises an amplifier output connector 254. The amplifier output connector 254 is coupled with the amplifier adapter 150 that comprises the amplifier connector 158 and the AC receptacle 160. The electrical extension cord 222 comprises an electrical cord 222B terminated on one end by an AC receptacle 222A and terminated on the other end by an AC plug 222C. Likewise, the electrical extension cord 224 comprises an electrical cord 224B terminated on one end by an AC receptacle 224A and terminated on the other end by an AC plug 224C. In one implementation, the electrical extension cords 222 and 224 may be 12 or 14 gauge AWG extension cords. In another implementation, the electrical extension cords 222 and 224 may be other suitable extension cords. As illustrated, loudspeaker system 202 is coupled to the loudspeaker adapter 100 and the amplifier system 252 is coupled to the amplifier adapter 150. The AC plug 110 of the loudspeaker adapter 100 is connected to the AC receptacle 222A of the extension cord 222, the AC plug 222C of the extension cord 222 is connected to the AC receptacle 224A of the extension cord 224, and the AC plug 224C of the extension cord 224 is connected to the AC receptacle 160 of the amplifier adapter 150. However, it is noted that in other examples, the loudspeaker adapter 100 and the amplifier adapter 150 can be connected together via any suitable number of electrical extension cords.

Figure 3:
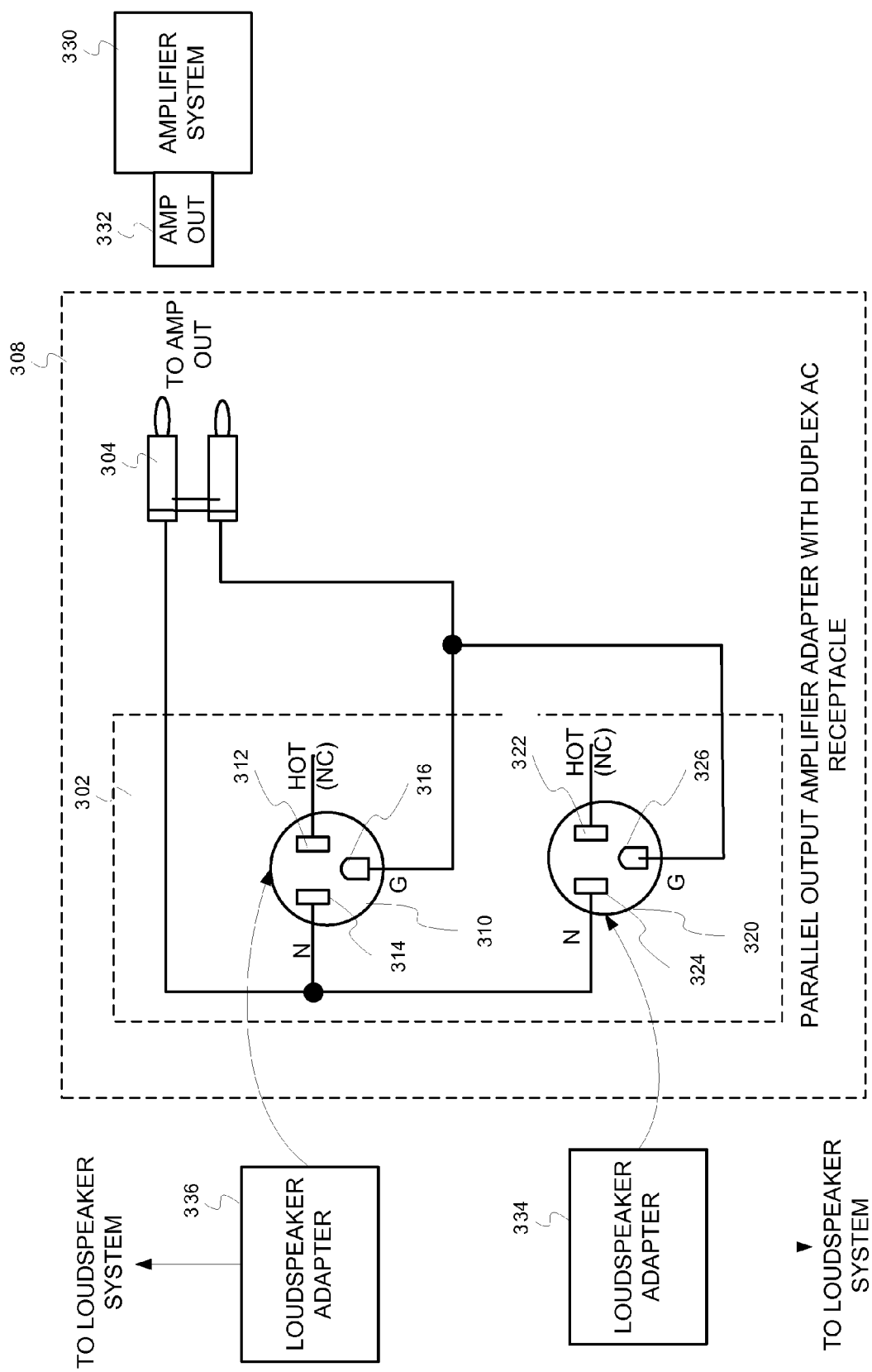
FIG. 3 is an example circuit diagram illustrating a parallel output amplifier adapter assembly.

FIG. 3 is an example circuit diagram illustrating a parallel output amplifier adapter. FIG. 3 depicts an amplifier system 330, a parallel output amplifier adapter 308, and loudspeaker adapters 334 and 336. The amplifier system 330 comprises an amplifier output connector 332 that couples to the parallel output amplifier adapter 308. The parallel output amplifier adapter 308 comprises an amplifier connector 304 that is matched to and that connects to the amplifier output connector 332. In the parallel output amplifier adapter 308, the amplifier connector 304 is coupled to a duplex AC receptacle 302. For example, the duplex AC receptacle 302 can be a duplex NEMA 5-15 receptacle with two AC receptacle halves 310 and 320. The AC receptacle half 310 comprises a hot terminal 312, a neutral terminal 314, and a ground terminal 316. The AC receptacle half 320 also comprises a hot terminal 322, a neutral terminal 324, and a ground terminal 326. The AC receptacle halves 310 and 320 of the duplex AC receptacle 302 provide means to connect one parallel output amplifier adapter 308 to two loudspeaker systems (not shown) via electrical extension cords. As illustrated, the hot terminals 312 and 322, of the AC receptacle halves 310 and 320 respectively, are never used to carry audio signals and are left unconnected to prevent safety hazards and damage to components of the amplifier system 330 and the loudspeaker systems. The neutral terminals 314 and 324 in conjunction with the ground terminals 310 and 320 provide a path to deliver audio output power from the amplifier system 330 to the loudspeaker systems using the loudspeaker adapters 334 and 336.

The parallel amplifier adapter can be constructed by connecting the neutral terminals 314 and 324 to each other and also to one terminal of the amplifier connector 304. Likewise, the ground terminals 316 and 326 are connected together and are also connected to the other terminal of the amplifier connector 304. Such a connection of the duplex AC receptacle 302 to the amplifier connector 304, allows the parallel output amplifier adapter 308 to be used to power two loudspeaker systems from a single amplifier channel. Each half of the duplex AC receptacle 302 carries the same signal from the amplifier output terminal 332 and provides a parallel connection to the two loudspeaker systems. As depicted in FIG. 3, a loudspeaker adapter 336 is coupled to the AC receptacle half 310, while a loudspeaker adapter 334 is coupled to the AC receptacle half 320. The loudspeaker adapters 334 and 336 are connected to their respective loudspeaker systems. The loudspeaker adapters 334 and 336 may be embodied as the loudspeaker adapter 100 of FIG. 1A. In some examples, because a single amplifier system 330 powers two loudspeaker systems, the two loudspeaker systems should be of the appropriate power ratings so as to match a power transfer capability of the amplifier system 330. For example, two 100 watt loudspeaker systems—each with 8Ω impedance, may be connected in parallel to an amplifier system, which is rated to output 200 watts into a 4Ω load. As illustrated, one parallel output amplifier adapter 308 can be connected to two loudspeaker adapters 334 and 336 using at least two electrical extension cords to interconnect the amplifier system 330 with respective loudspeaker systems. This precludes the need for daisy-chaining the loudspeaker systems (i.e., connecting a first loudspeaker system to the amplifier system, connecting the second loudspeaker system to the first loudspeaker system, and so on), which typically increases the load on the amplifier system and reduces audio power output available to the second and subsequent loudspeaker systems. Also, although not depicted in FIG. 3, the duplex AC receptacle 302 and/or the parallel output amplifier adapter 308 may be mounted in an approved metal or plastic enclosure.

Figure 4:
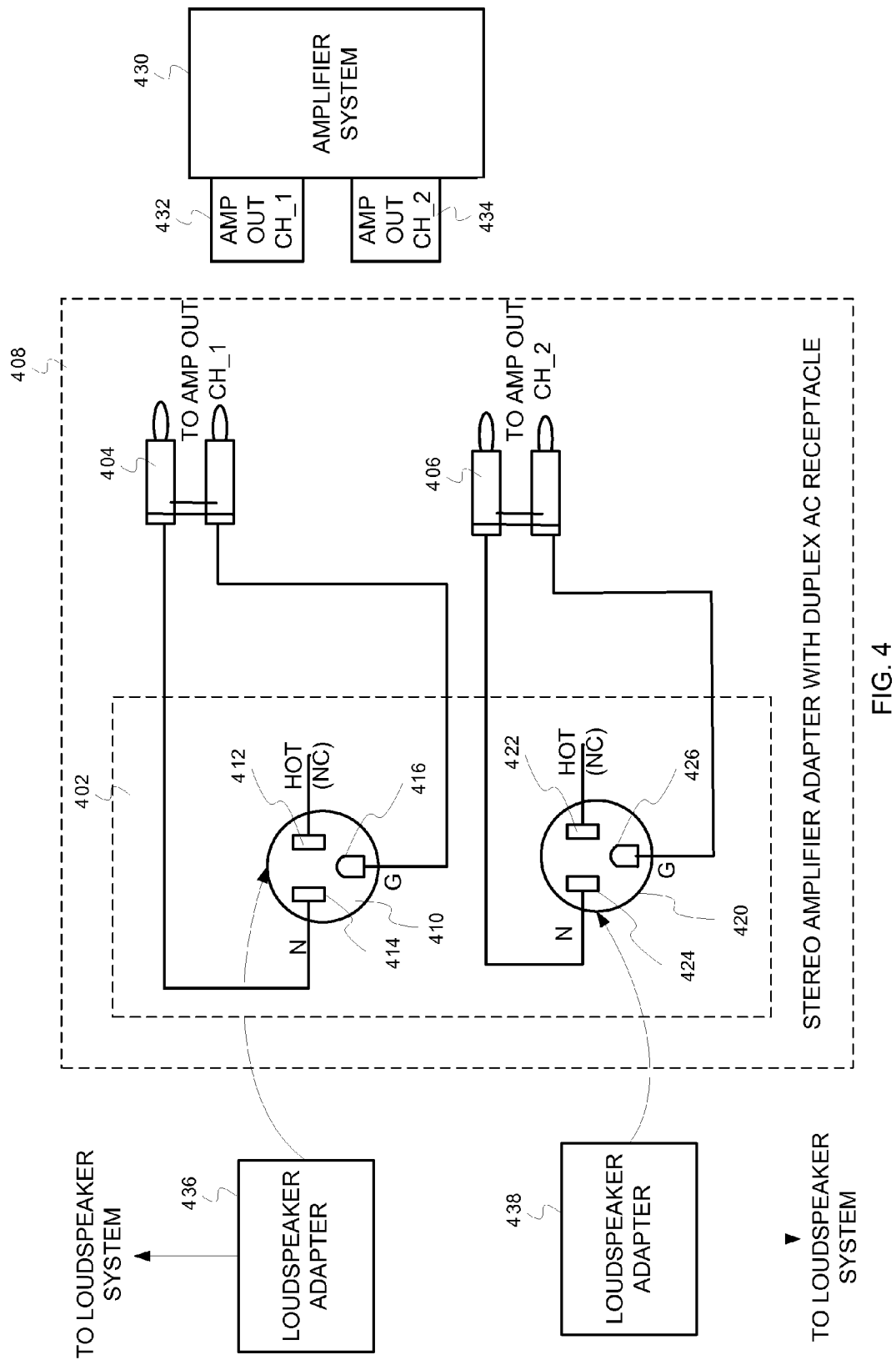
FIG. 4 is an example circuit diagram illustrating a stereo amplifier adapter assembly.

FIG. 4 is an example circuit diagram illustrating a stereo amplifier adapter. FIG. 4 depicts a stereo amplifier system 430, a stereo amplifier adapter 408, and loudspeaker adapters 436 and 438. The stereo amplifier system 430 comprises two amplifier output connectors 432 and 434 that couple to the stereo amplifier adapter 408. The amplifier output connector 432 provides an amplified audio signal on a first audio channel, while the amplifier output connector 434 provides an amplified audio signal on a second audio channel. The stereo amplifier adapter 408 comprises two amplifier connectors 404 and 406 that are matched to, and that connect to the amplifier output connectors 432 and 434, respectively. In the stereo amplifier adapter 408, the two amplifier connectors 404 and 406 are also coupled to a duplex AC receptacle 402. For example, the duplex AC receptacle 402 can be a duplex NEMA 5-15 receptacle with two receptacle halves 410 and 420. The AC receptacle half 410 comprises a hot terminal 412, a neutral terminal 414, and a ground terminal 416. The AC receptacle half 420 comprises a hot terminal 422, a neutral terminal 424, and a ground terminal 426. The two AC receptacle halves 410 and 420 of the duplex AC receptacle 402 provide means to convey amplifier output power from two independent audio channels to two separate loudspeaker systems (not shown) via electrical extension cords. As illustrated, the hot terminals 412 and 422, of the AC receptacles 410 and 420 respectively, are not used to carry audio signals and are left unconnected. Also, the neutral terminal 414 and the ground terminal 416 are connected to the amplifier connector 404 and provide an audio signal path for the first channel to a first loudspeaker system. The neutral terminal 424 and the ground terminal 426 are connected to the amplifier connector 406 and provide an audio signal path for the second channel to a second loudspeaker system.

The stereo amplifier adapter 408 can be constructed by combining two individual amplifier adapters (depicted in FIG. 1B) into a single stereo amplifier adapter 408 and connecting the two individual amplifier adapters to the duplex AC receptacle 402. In the stereo amplifier adapter 408, the two AC receptacle halves are separated by cutting shunt bars on the AC receptacle 402. In the stereo amplifier adapter 408, each half of the duplex AC receptacle 402 carries the audio signal from one amplifier audio channel. The amplifier connectors 404 and 406 may share a common negative terminal, which connects to the duplex AC receptacle's ground terminal. In other words, although not depicted in FIG. 4, the ground terminals 416 and 426 may be connected together internally in the duplex receptacle 402. As depicted in FIG. 4, a loudspeaker adapter 436 is coupled to the AC receptacle 410, while another loudspeaker adapter 438 is coupled to the AC receptacle 412. The loudspeaker adapters 436 and 438 are connected to their respective loudspeaker systems. The loudspeaker adapters 436 and 438 may be embodied as the loudspeaker adapter of FIG. 1A. In some examples, because a single amplifier output powers two loudspeaker systems, the two loudspeaker systems should be of appropriate power ratings so as to match the power transfer capability of the amplifier system 430.

It should be noted that although FIGS. 1A-4 describe the loudspeaker adapter 100 as comprising an AC plug (i.e., a male connector) and the amplifier adapter 150 as comprising an AC receptacle (i.e., a female connector), in some embodiments, the loudspeaker adapter 100 may comprise the AC receptacle while the amplifier adapter 150 may comprise the AC plug. Additionally, although FIGS. 3 and 4 describe techniques for using duplex AC receptacles for connecting two loudspeaker systems to a single amplifier system, in other embodiments, any common electrical outlet multiple-tap units comprising any suitable number of AC receptacles can be used to connect any suitable number of loudspeaker systems to the amplifier system. It should be noted, however, that the power ratings and current ratings of the loudspeaker systems and the amplifier system should be taken into consideration before connecting loudspeaker systems and the amplifier system via the loudspeaker adapter(s), amplifier adapter(s), and the electrical extension cords.

While the embodiments are described with reference to various implementations and exploitations, it will be understood that these embodiments are illustrative and that the scope of the inventive subject matter is not limited to them. In general, audio system adapters for audio signal distribution using electrical extension cables as described herein may be implemented with facilities consistent with any hardware system or hardware systems. Many variations, modifications, additions, and improvements are possible.

Plural instances may be provided for components, operations, or structures described herein as a single instance. Finally, boundaries between various components are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An audio device adapter comprising:
   an audio connector configured to couple to a positive and a negative audio terminal on an audio device, wherein the audio connector comprises a first terminal configured to couple to the positive audio terminal on the audio device and a second terminal configured to couple to the negative audio terminal on the audio device; and
   an AC connector coupled to the audio connector and comprising a ground terminal, a neutral terminal, and a hot terminal, wherein the neutral terminal of the AC connector is coupled to the first terminal of the audio connector, and the ground terminal of the AC connector is coupled to the second terminal of the audio connector.

2. The audio device adapter of claim 1, wherein the hot terminal of the AC connector is not connected to the audio connector.

3. The audio device adapter of claim 1, wherein the AC connector comprises a male AC connector configured to couple to a female AC connector of an AC extension cord.

4. The audio device adapter of claim 1, wherein the AC connector comprises a female AC connector configured to couple to a male AC connector of an AC extension cord.

5. The audio device adapter of claim 1, wherein the AC connector is a NEMA 5-15 connector.

6. A loudspeaker adapter comprising:
   an audio connector configured to couple to a positive and a negative audio terminal on a loudspeaker system, wherein the audio connector comprises a first terminal configured to couple to the positive audio terminal on the loudspeaker system and a second terminal configured to couple to the negative audio terminal on the loudspeaker system; and
   an AC connector coupled to the audio connector and comprising a ground terminal, a neutral terminal, and a hot terminal, wherein the neutral terminal of the AC connector is coupled to the first terminal of the audio connector, the ground terminal of the AC connector is coupled to the second terminal of the audio connector, and the hot terminal of the AC connector is not connected to the audio connector.

7. The loudspeaker adaptor of claim 6, wherein the AC connector comprises a male AC connector configured to couple to a female AC connector of an AC extension cord or a female AC connector configured to couple to a male AC connector of an AC extension cord.

8. The loudspeaker adapter of claim 6, further comprising a protection circuit, wherein the audio connector is coupled to the AC connector via the protection circuit.

9. The loudspeaker adapter of claim 6, further comprising a protection circuit, wherein the protection circuit comprises a first fuse, a second fuse, and a overvoltage device, wherein a first terminal of the first fuse is coupled to the neutral terminal of the AC connector and a second terminal of the first fuse is coupled to a first terminal of the overvoltage device and to the first terminal of the audio connector, wherein a first terminal of the second fuse is coupled to the ground terminal of the AC connector and a second terminal of the second fuse is coupled to a second terminal of the overvoltage device and to the second terminal of the audio connector.

10. The loudspeaker adapter of claim 6, wherein the loudspeaker audio connector is a banana plug, a $\frac{1}{4}^{th}$ inch phone plug, or a Speakon plug.

11. An amplifier adapter comprising:
    an audio connector configured to couple to a positive and a negative audio terminal on an amplifier system, wherein the audio connector comprises a first terminal configured to couple to the positive audio terminal on the amplifier system and a second terminal configured to couple to the negative audio terminal on the amplifier system; and
    an AC connector coupled to the audio connector and comprising a ground terminal, a neutral terminal, and a hot terminal, wherein the neutral terminal of the AC connector is coupled to the first terminal of the audio connector, the ground terminal of the AC connector is coupled to the second terminal of the audio connector, and the hot terminal of the AC connector is not connected to the audio connector.

12. The amplifier adapter of claim 11, wherein the AC connector comprises a female AC connector configured to couple to a male AC connector of an AC extension cord or a male AC connector configured to couple to a female AC connector of an AC extension cord.

13. The amplifier adapter of claim 11, wherein the amplifier audio connector is a banana plug, a $\frac{1}{4}^{th}$ inch phone plug, or a Speakon plug.

14. An amplifier adapter comprising:
    an amplifier audio connector configured to couple to a positive and a negative amplifier audio terminal on an amplifier system, wherein the amplifier audio connector comprises a first terminal configured to couple to the positive amplifier audio terminal on the amplifier system and a second terminal configured to couple to the negative amplifier audio terminal on the amplifier system; and
    a duplex AC connector comprising a first AC connector and a second AC connector, wherein the first AC connector and the second AC connector are coupled to the amplifier audio connector, wherein each of the first AC connector and the second AC connector comprise a ground terminal, a neutral terminal, and a hot terminal, and wherein the neutral terminal of the first AC connector and the neutral terminal of the second AC connector are coupled to the first terminal of the amplifier audio connector, the ground terminal of the first AC connector and the ground terminal of the second AC connector are coupled to the second terminal of the amplifier audio connector, and the hot terminal of the first AC connector and the hot terminal of the second AC connector are not connected to the amplifier audio connector.

15. The amplifier adapter of claim 14, wherein the first AC connector of the duplex AC connector is configured to couple to a first loudspeaker adapter associated with a first loudspeaker via a first AC extension cord, and the second AC connector of the duplex AC connector is configured to couple to a second loudspeaker adapter associated with a second loudspeaker via a second AC extension cord, wherein the first AC connector and the second AC connector of the duplex AC connector are configured to provide an audio output on one audio channel of the amplifier system to the first and second loudspeakers.

16. The amplifier adapter of claim 14, further comprising:
a second amplifier audio connector configured to couple to a second positive and a second negative amplifier audio terminal on the amplifier system, wherein the second amplifier audio connector comprises a first terminal configured to couple to the second positive amplifier audio terminal on the amplifier system and a second terminal configured to couple to the second negative amplifier audio terminal on the amplifier system; and
the duplex AC connector, wherein the first AC connector is coupled to the first amplifier audio connector and the second AC connector is coupled to the second amplifier audio connector, wherein the neutral terminal of the first AC connector is coupled to the first terminal of the first amplifier audio connector, the ground terminal of the first AC connector is coupled to the second terminal of the first amplifier audio connector, the hot terminal of the first AC connector is not connected to the first amplifier audio connector, the neutral terminal of the second AC connector is coupled to the first terminal of the second amplifier audio connector, the ground terminal of the second AC connector is coupled to the second terminal of the second amplifier audio connector, and the hot terminal of the second AC connector is not connected to the second amplifier audio connector.

17. The amplifier adapter of claim 16, wherein the first amplifier audio connector and the first AC connector of the duplex AC connector are configured to couple to a first loudspeaker adapter associated with a first loudspeaker via a first AC extension cord, and the second amplifier audio connector and the second AC connector of the duplex AC connector is configured to couple to a second loudspeaker adapter associated with a second loudspeaker via a second AC extension cord, wherein the first amplifier audio connector and the first AC connector are configured to provide an audio output on a first audio channel of the amplifier system to the first loudspeaker, and the second amplifier audio connector and the second AC adapter are configured to provide an audio output on a second audio channel of the amplifier system to the second loudspeaker.

18. The amplifier adapter of claim 16, wherein the duplex AC connector does not include a shunt bar connecting the first AC connector and the second AC connector in the duplex AC connector.

19. The amplifier adapter of claim 14, wherein each of the first and second AC connectors of the duplex AC connector is a female AC connector configured to couple to a male AC connector of an AC extension cord or a male AC connector configured to couple to a female AC connector of the AC extension cord.

20. The amplifier adapter of claim 14, wherein the first AC connector and the second AC connector are NEMA 5-15 connectors.

\* \* \* \* \*